United States Patent [19]

Evers et al.

[11] Patent Number: 5,088,958
[45] Date of Patent: Feb. 18, 1992

[54] APPARATUS FOR FILLETING FISH

[76] Inventors: Reinhard Evers, Jahnstr. 5, 2406 Stockelsdorf; Werner Wenzel, Doberanweg 8, 2400 Lübeck, both of Fed. Rep. of Germany

[21] Appl. No.: 577,681

[22] Filed: Sep. 4, 1990

[30] Foreign Application Priority Data

Sep. 9, 1989 [DE] Fed. Rep. of Germany ....... 3930195

[51] Int. Cl.$^5$ .............................................. A22C 11/02
[52] U.S. Cl. .................................... 452/162; 452/152; 452/160; 452/161; 452/163
[58] Field of Search ................. 452/150, 151, 152, 153, 452/160, 161, 163

[56] References Cited

U.S. PATENT DOCUMENTS

| 2,497,554 | 2/1950 | Meissner | 452/162 |
| 2,565,727 | 8/1951 | Henderson | 452/158 |
| 3,309,730 | 3/1967 | Michael | 452/153 |
| 4,037,294 | 7/1977 | Cowie et al. | 452/161 |
| 4,236,275 | 12/1980 | Westerdahl | 452/135 |
| 4,365,387 | 12/1982 | Hartmann et al. | 452/161 |
| 4,748,721 | 6/1988 | Braeger | 452/127 |
| 4,924,553 | 5/1990 | Grosseholz et al. | 452/149 |

FOREIGN PATENT DOCUMENTS 557569 11/1957 Belgium .................... 452/149

Primary Examiner—James G. Smith
Assistant Examiner—Lawrence Cruz
Attorney, Agent, or Firm—Morrison Law Firm

[57] ABSTRACT

An apparatus for severing the fillets from fish rumps comprises cutting tools each composed of pairs of circular knives for cutting free the belly spokes, the back spokes and the ribs or vertebral appendages, respectively. The last mentioned cutting tool has a double function which consists in that each circular knife of this tool is associated with a guiding element, which, in its rest position, lies against the inner face of the circular knife with its guiding face. The guiding edges of the guiding elements support the vertebrae of the vertebral column and can be displaced within the cutting planes of the circular knives and can be controlled, in their displaced position, into a position in which a gap for the passage of the ribs or the vertebral appendages is opened between the inner face of the circular knives and the guiding face. The displacement of the guiding elements occurs by the effect of transporting disks, which support the vertebrae of the vertebral column on the opposing side.

15 Claims, 3 Drawing Sheets

APPARATUS FOR FILLETING FISH

FIELD OF THE INVENTION

The invention relates to an apparatus for severing muscle meat in the form of fillets from the skeleton of decapitated fish, which are conveyed against their normal swimming direction, by means of cutting tools, which include pairs of essentially parallel circular knives, each, for cutting free the belly spokes and the back spokes, respectively, as well as circular knives arranged in a roof-like manner relative to each other, for cutting free at least one of the ribs and the lateral vertebral appendages; and guides which intrude into the incisions produced by the cutting tools, respectively.

PRIOR ART

An apparatus of this type is known from DE-OS 1 454 087. The filleting apparatus disclosed therein comprises cutting tools consisting of pairs each of circular knives for cutting free the muscle meat from the belly and the back spokes, from the ribs and/or the vertebral appendages and from the flanks of the vertebral column. The controlling of the cutting tool for cutting free the ribs and/or the vertebral appendages is performed by flaps which, in their basic position, cover the operative portion of the cutting edges of the circular knives. The fish are conveyed through the apparatus by means of a push-saddle conveyor.

Although a result which is unobjectionable with respect to its quality can be obtained with this apparatus, the latter is, due to the manner of the conveying, insufficient with regard to its efficiency and expensive regarding the number of the tools having to be utilized.

Furthermore, there is known from DE-PS 37 23 860 an apparatus concerning a filleting device having a vertically arranged guide path for the fish and including one pair, each, of cutting tools for cutting free the belly spokes and the back spokes. The tool for cutting free the belly spokes can be displaced radially and is arranged such that the incisions of the cutting tools meet in the tail region of the fish at both sides of the vertebral column so that a complete cutting free of the fillets occurs in this region. Due to the radial displacibility of the cutting tool for cutting free the belly spokes, this tool is displaced in the region of the belly cavity by the ribs and/or the lateral vertebral appendages which start here on the vertebral column, so that the fillets remain attached to these parts of the skeleton. The complete separation occurs by means of a rib tool designed as a scraping tool, which follows the first mentioned cutting tools and, with its cutting planes, continues the incisions at both sides of the belly spokes.

It is disadvantageous in this apparatus that the cutting tools for cutting free the belly spokes and the back spokes are adjusted according to the thickness of the vertebrae in the tail region, so that fillet meat remains on the flanks of the belly and the back spokes, which reduces the yield in fillet meat correspondingly. This loss in yield is particularly very high in the processing of fish having high backs, because, in this case, the cutting planes are very large compared with the thickness of the fillet.

Another apparatus can be taken from DE-PS 23 50 561, which has one pair each of belly filleting knives and back filleting knives mounted in a machine-fixed manner, the back filleting knives being displaceable against spring force. The distance of the pairs of knives is selected such that their cutting planes are tangential to the flanks of the belly and the back spokes. The vertebrae of the vertebral column, which are thicker With regard to this distance therefore effect that the belly filleting knives are displaced radially, so that initially the fillets remain attached to the flanks of the vertebral column in the tail region. Subsequently, these connections are severed by a specific separating tool which consists of a pair of knife blades, which extend into the path of the ribs in a roof-like arrangement with respect to each other and which are arranged in the region of transport disks engaging the skeleton of the fish in a conveying manner.

This design followed one known from DE-OS 22 21 269, which could not be realized due to insufficiently effective conveying. Furthermore, this design as well as that known from DE-PS 23 50 561 has the disadvantage that following the use of fixed knife blades particularly under the aspects of the nowadays common machine outputs and yields a safe and accurate passage cannot be guaranteed due to the natural tolerances of the skeleton, and also the cutting quality which is obtained is unsatisfactory.

OBJECTS OF THE INVENTION

It is therefore a main object of the invention to suggest a device for filleting fish which is very compact similar to devices according to the prior art but can be produced at reduced cost by reducing the number of tools to be utilized.

It is a further important object of the present invention to safeguard an accurate passage of the fillets through the machine at high yield.

SUMMARY OF THE INVENTION

In an apparatus comprising cutting tools including pairs of essentially parallel circular knives for cutting free the belly spokes and the back spokes, respectively, as well as roof-like arranged circular knives for cutting free the ribs or the lateral vertebral appendages, and including guides intruding into the incisions produced by the respective cutting tools, these objects are achieved, according to the invention, in that the guides arranged in the region of the cutting tool for cutting free the ribs or the lateral vertebral appendages comprise guiding elements, which have guiding faces arranged parallel to the respective inner faces of the relative circular knives, which guiding faces are arranged to be displaced parallel to the respective neighboring circular knife against spring force in a first movement, and to be controlled to approach each other in a second movement in a direction perpendicular to said circular knife.

The advantages thus to be obtained particularly consist in that a cutting quality can be achieved by the suggested apparatus which does not only effect an increase in the esthetic value of the product but also has, e.g. in the processing of flatfish, the effect that the fillets can be skinned without the danger of splitting in the region of the central line. Moreover, the expenditure in manufacturing the apparatus is reduced by the fact that the cutting tool for cutting free the ribs or the lateral vertebral appendages is additionally used for the cutting free of the fillets from the flanks of the vertebral column in the tail region.

For achieving this double function in a very expedient manner, the guiding elements may be arranged such that, in their basic position, they cover completely at least the operative portions of the cutting edges of the circular knives with the guiding edges of the guiding element lying essentially tangential to that portion of the cutting edge which is in the area of the ridge thereof. In such arrangement the controlling can be performed advantageously in that a sensor controlling the path of the belly spokes is arranged upstream of the cutting tool for cutting free the ribs or the lateral vertebral appendages, respectively, a signal issued by said sensor being utilized for controlling the guiding elements to move into their operative position.

According to a preferred embodiment of the invention, the sensor may be designed as a photoelectrically active transmitted-light sensor, which may be arranged in a guide which is positioned upstream of and lies flush with the guiding elements, which guide is composed of a pair of web elements leaving a gap between them for the passage of the belly spokes, the sensor comprising a light emitter and a light receiver, which are arranged in the web elements in opposing positions on both sides of the gap.

To avoid soiling and uncontrolled mechanical stressing of the sensor elements, the web elements of the guide can be manufactured from a wear resistance plastic material, into which the sensor elements are inserted in such a way that they are covered with respect to the faces of the web elements bounding the gap, so that the sensor light passes the covering layer.

In order to adapt the controlled path of movement of the guiding elements into their operative position, i.e. the size of the gap between the guiding faces thereof and the inner face of each cutting tool for cutting free the ribs or the lateral vertebral appendages to the size of the respective fish being treated, the controlled path of the guiding elements can be restricted in dependancy on the respective thickness of the vertebral column.

In order to safeguard a highly friction-reduced displacement of the vertebral column into a position underneath the circular knives of the cutting tool for cutting free the ribs or the lateral vertebral appendages and thus of the guiding elements of the guide component into a position depending on the respective diameter of the vertebrae, a pair of cone-disk-shaped transport disks having a periphery appropriate for easy gripping may advantageously be provided in the planes of the web elements intruding into the incisions made adjacent to the back spokes and in the region opposing the guiding elements of the guide component, the arrangement of these disks being such that guiding edges of said guiding elements lie essentially tangential with the part of the periphery facing the path of the fish being treated. For the purpose of controlled movement of the ribs under the circular knives cutting these ribs free, a set of pressing lamella may expediently be provided in the region immediately upstream of each of these circular knives, which lamella may be arranged for controlled movement from an outward position into the path of the fish rumps and against flanks thereof in cooperation with the controlled movement of the guiding elements into their operative position. The anatomic facts and conditions may, in such arrangement, be taken into account by arranging the single pressing lamella of each set to be moved under control in a time-graduated manner.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings

DETAILED DESCRIPTION OF THE PREFERRED EMBODIMENTS

Figure 1:
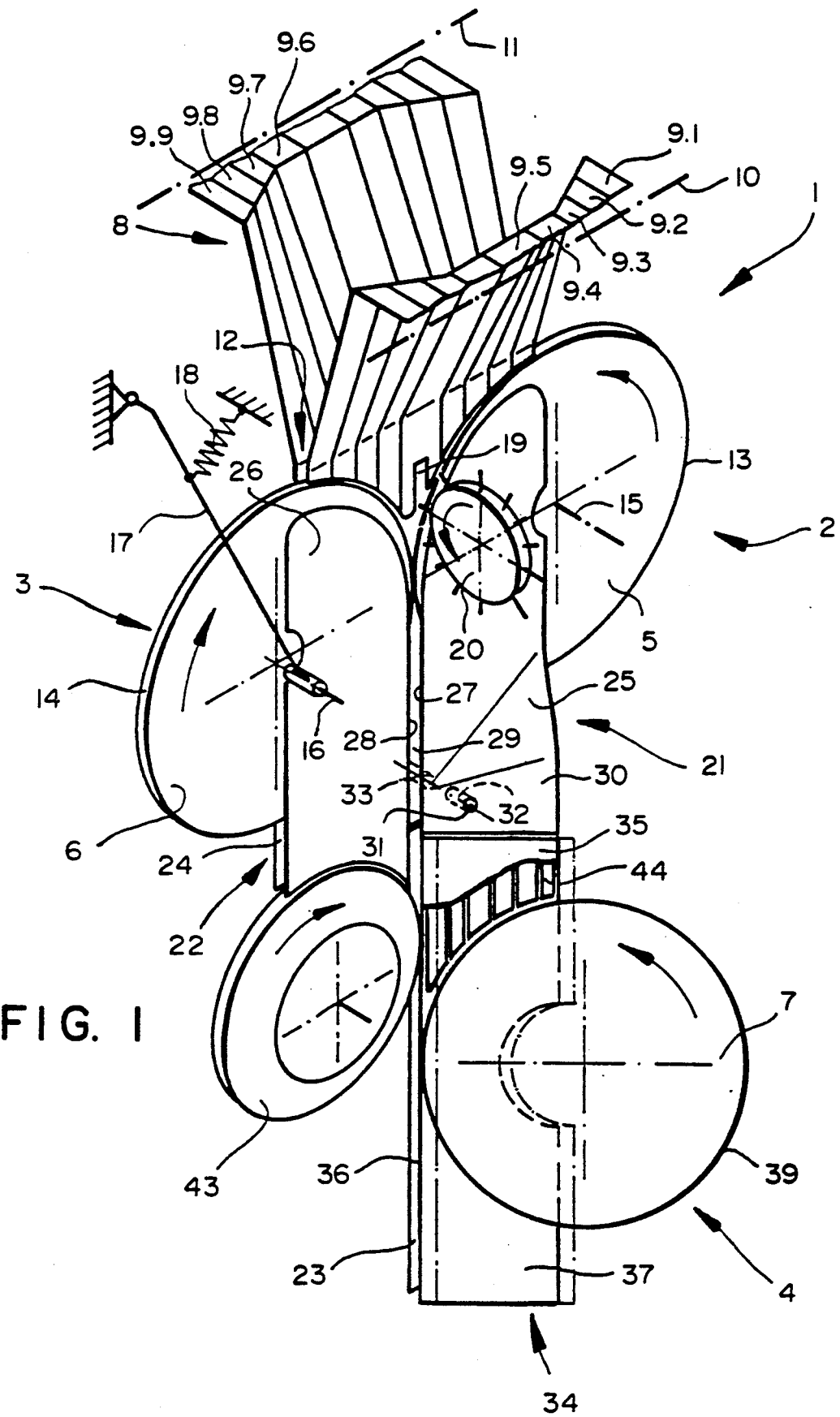
FIG. 1 shows a total view of an apparatus designed in accordance with the present invention in an axonometric representation.

A filleting apparatus 1 designed in accordance with the present invention is arranged in a machine frame not shown in detail, and comprises as main components/aggregates cutting tools 2, 3 and 4 associated with each other as shown in FIG. 1 and serving for culling free the belly spokes, the back spokes and the ribs or lateral vertebral appendages, respectively, these cutting tools 2, 3 and 4 each comprising pairs of circular knives 5, 6 and 7, respectively, which are driven in an appropriate manner. Upstream of the cutting tools 2 and 3 there is a feeding funnel 8, which is composed of a number, e.g. nine pairs of guiding flaps 9.1 to 9.9 arranged symmetrically with respect to each other on both sides of the fish path, i.e. the path of movement of the fish through the machine. These flaps are mounted pivotally about horizontal axes 10 and 11, respectively, and are coupled with each other in a known and nonshown manner to be displaceable synchronically, while they are held against each other by spring force. In the rest position of the guiding flaps 9.1 to 9.9 there remains a parallel gap 12 at their lower ends. These lower ends of the guiding flaps 9.1 to 9.9 immediately oppose circumferential cutting edges 13 and 14 of the circular knives 5 and 6 of the cutting tools 2 and 3, respectively, and are designed, as shown in FIG. 1, such that they follow the circular contour of the circular knives 5 and 6. Each one of the circular knives 5 and 6 is mounted individually. The axes 15 of the circular knives 5 are mounted fixed to the machine frame, while the axes 16 of the circular knives 6 are mounted on a pivot lever 17, which is held pivoted into the path of the fish against an abutment by a spring 18. Each guiding flap 9.5 of the central pair of the guiding flaps forming the feeding funnel 8 is provided with a recess 19 in the region of the lower ends, which recess is penetrated by a spike wheel 20 thus reaching into the feeding funnel 8. The spike wheels 20 are driven in an appropriate manner and are mounted on non-shown levers, which are able to be pivoted outwardly against spring force.

Figure 2:
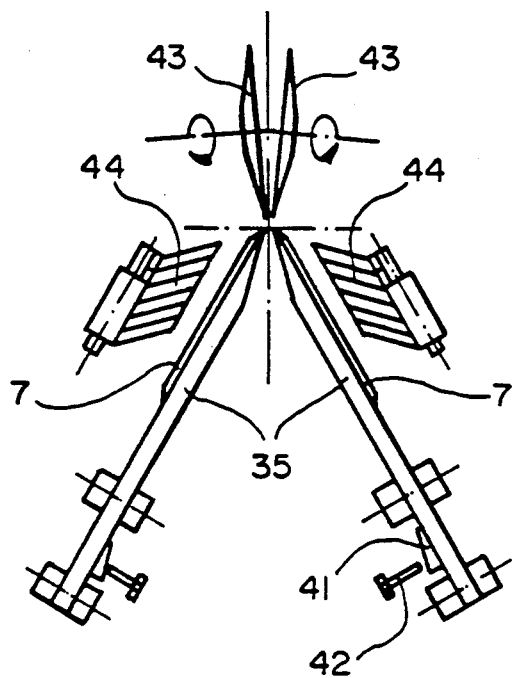
FIG. 2 shows a cross section to the apparatus of FIG. 1 in the region of the transport disks and of the cutting tool for the ribs before the arrival of a fish to be treated.
Figure 3:
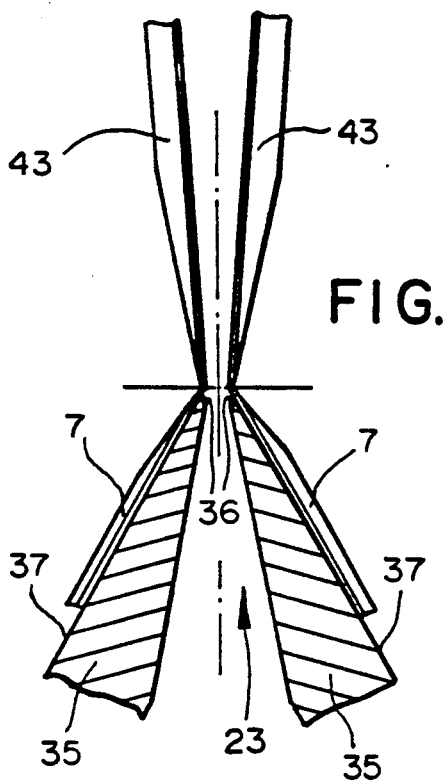
FIG. 3 shows a cross-section according to FIG. 2, but represented as a partial section on an enlarged scale.
Figure 4:
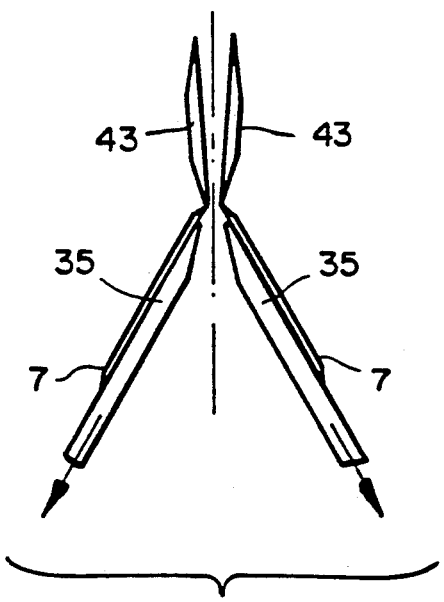
FIG. 4 shows a cross-section through the apparatus according to FIG. 2, but after the arrival of a fish.
Figure 5:
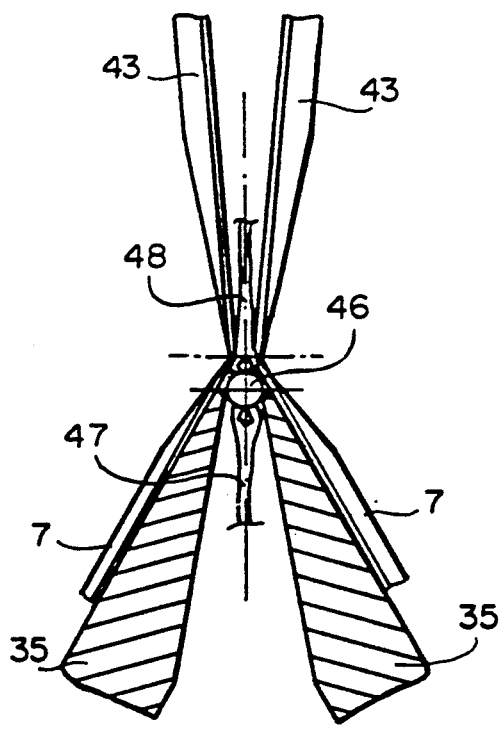
FIG. 5 shows the cross-section according to FIG. 4, but by way of a partial section on an enlarged scale.
Figure 6:
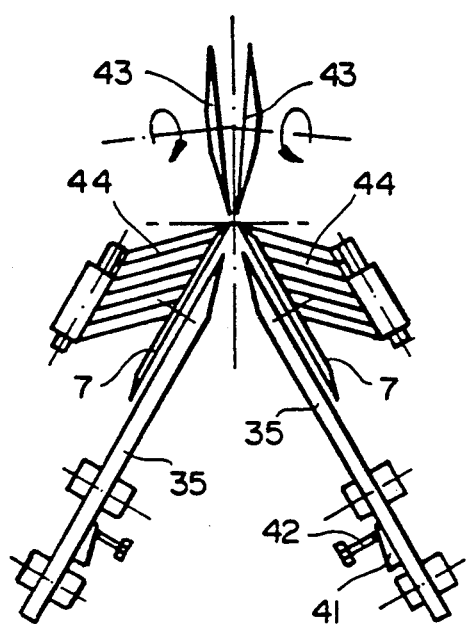
FIG. 6 shows a cross-section through the apparatus in accordance with FIG. 2 upon the arrival of the belly cavity and of a fish.
Figure 7:
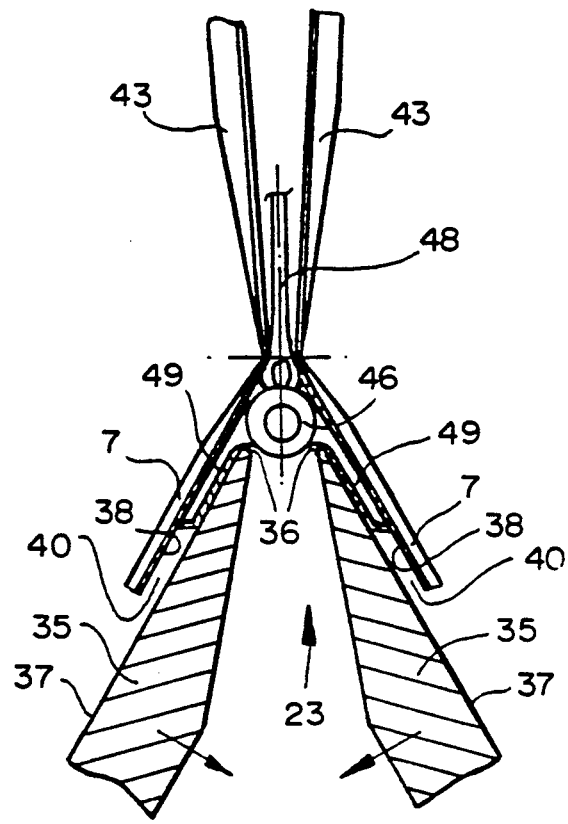
FIG. 7 shows a cross-section in accordance with FIG. 6, but as a partial section on an enlarged scale.
Figure 8:
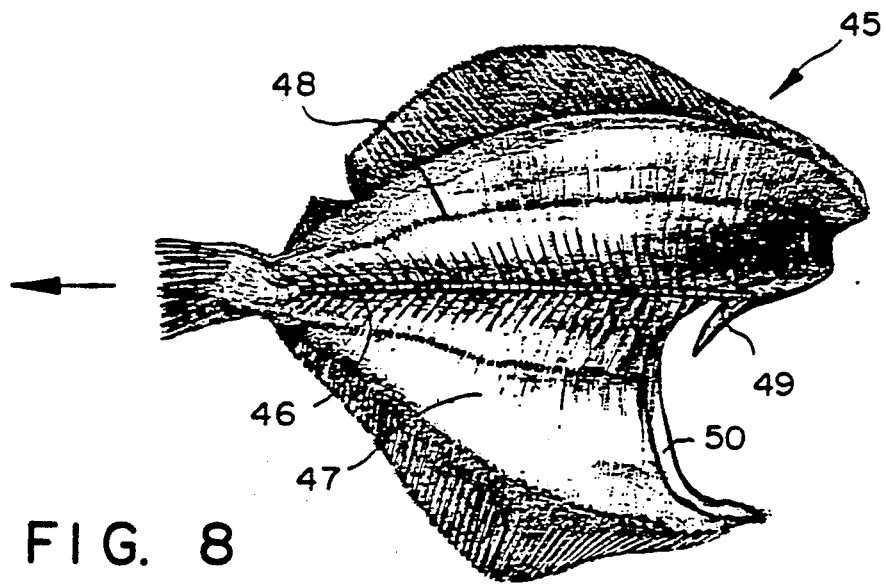
FIG. 8 a side elevation of a flatfish skeleton.

The guiding of fish rumps 45 between the cutting tools 2 and 3, on the one hand, and the cutting tool 4, on the other, is performed by means of one pair each of first guides 21 engaging along the belly spokes, and second guides 22, engaging along the back spokes, respectively, these guides each leaving between them a gap 23 and 24, respectively, for the passage of the belly spokes 47 and the back spokes, respectively. The guides 21 and 22 are each formed by two (first and second) web elements 25 and 26, respectively, which lie against the outer flank of the associated circular knives 5 and 6, respectively, of the cutting tools 2 and 3, respectively, and have first and second guide edges 27 and 28, respectively, which oppose each other while forming a lateral gap 29 for the passage of the ribs 49 or the lateral vertebral appendages, and which aligned essentially tangential to the circumferential cutting edges 13 and 14, respectively. The outer faces of the web elements 25 initially extending essentially parallel with respect to each other are formed with a roof-shaped end region 30 towards the cutting tool 4, the angular position of this end region corresponding to that of the circular knives 7 of the cutting tool 4. In this end region 30 there is arranged a sensor 31 comprising a light emitter 32 and a light receiver 33 such that these components face each other on both sides of the gap 23. The arrangement shown in FIG. 4 is such that the respective sensor face is covered with regard to the faces of the web elements 25 bounding the gap 23. The roof-shaped end region 30 is continued by a separate third guide portion 34, which is composed by a pair of guiding elements 35, each of which is provided with a third guiding edge 36 and a guiding face 37. The guiding elements 35 are mounted to be movable in two degrees of freedom. The basic position for this movability is a rest position in which the third guiding edges 36 continue the first guide edges 27 of the first web elements 25, and in which the guiding faces 37 lie against the inner faces 38 of the circular knives 7 of the third cutting tool 4. The circumferential cutting edges 39 of the third circular knives 7 lie, in this case, tangential with the first guide edges 27. Following the first degree of freedom each guiding element 35 can, as shown in FIG. 2, be displaced in the cutting planes of the associated circular knives 7 against spring force, so that a part of the circumferential cutting edge 39 of the third circular knives 7 lies free. According to the second degree of freedom, and as shown in FIG. 3, each guiding element 35 can, when in its displaced position, be controlled into such a position in which a gap 40 is opened between the guiding face 37 of each guiding element 35 and the inner face 38 of each third circular knife. As can be taken from FIGS. 2 and 6, for restricting this controlled movement there is arranged a cam piece 41 on the inner side of each guiding element 35. This cam piece 41 lies in contact against a frame-fixed and adjustable abutment 42.

A pair of cone-disk-shaped transporting disks 43 is provided in the planes of the second web elements 26, the design of whose circumference is such that they have a good gripping effect (not shown), and which are driven in an appropriate manner to rotate at a circumferential speed which essentially corresponds to that of the spike wheels 20. The transporting disks 43 are arranged such that their circumference lies approximately tangential with the third guiding edges 36 of the guiding elements 35 when these are in their rest position.

A set of pressing lamella 44 which, for the sake of clearness, is only hinted at in FIG. 1, is arranged immediately upstream of each third circular knife 7 of the third cutting tool 4 and above the path of the fish rumps. These pressing lamella 44 can be moved under control by non-shown controlling means from a rest position in which the fish may pass into an operative position, in which they can contact the flanks of the fish in a resiliently displaceable manner.

The function of the apparatus according to the present invention will be described in the following in context with the passage of a fish.

A fish rump 45 to be filleted is fed into the feeding funnel 8 with the tail end leading and with its plane of symmetry parallel to the gap 12. In the first stage this rump is seized in the region of its tail fin at the bottom of the funnel by the pair of spike wheels 20 and is pulled into the feeding funnel 8, the feeding flaps 9.1 to 9.9 being displaced pairwise synchronically smoothly contacting the fish body while centering it. Upon passage of the tail fin of the fish through the gap 12 of the guiding flaps 9.1 to 9.9 an incision is made by the first and second cutting tools 2 and 3 to both sides of the belly spokes 47 and back spokes 48, respectively, up to the vertebral column 46, the second cutting tool 3 being displaced outwardly according to the respective thickness dimension of the vertebrae of the vertebral column 46. The first and second web elements 25 and 26 of the first and second guide components 21 and 22, respectively, penetrate the thus produced incisions. In order to be able to collect the cut-free fillet meat without resistance, these web elements are sharpened in their entering region.

In the further course of the filleting process the cut-free fillet parts move, at the belly side, onto the roof-shaped end region 30 of the first web elements 25, so that a corresponding spreading of these fillet parts occurs. They are thus transferred into the region of the guiding elements 35, whose third guiding edges 36 now take over the guiding. The pressing lamella 44 present above this transitional area are held in a rest position during this phase and are thus not in contact with the fish. The latter thus arrives in the region of the transporting disks 43, which now safeguard the further guiding of the fish by engaging with their gripping periphery the incisions produced by the second cutting tool 3 at the bottom of these incisions, i.e. at the vertebrae of the vertebral column 46. Simultaneously, the frame-fixed mounting of the axis of the transporting disks 43 has the effect that a pressure is exerted onto the vertebral column 46, which pressure displaces the column below the path followed up to this moment. The guiding elements 35 are displaced within the cutting planes of the third cutting knives 7 of the third cutting tool 4 into the position which is shown in broken lines in FIG. 1, so that the part of the circumferential cutting edges of the cutting knives 7 which faces the path of the fish is freed. This has the effect that the still existing connection of the fillets with the flanks of the vertebral column 46 is severed. Inner chamfers existent on the circular knives prevent that a cutting of the bones may occur.

Shortly before the fish rump 45 enters onto the guiding elements 35 the bone strip containing the bally spokes 47, which has been guided in the gap 23 and was cut free by the first cutting tool 2 effects that the light beam of the sensor 37 has been interrupted. In the course of the further conveyance, the leading belly cavity end with its support bone 50 now reaches the sensor 31, the arrival of this portion ending the interruption of the light beam. The signal thus emitted by the sensor 31 is evaluated with a delay taking into account the structural facts and the conveying speed such that the guiding elements 35 are controlled to move into a position at the moment of the arrival of the first rib pair in the region of the belly cavity end, in which position a gap 40 for the passage of the ribs 49 or the lateral vertebral appendages is opened between the guiding face 37 and the inner faces 38 of the third circular tools 7. The width of the gap 40 is, in each case, controlled via the cam piece 41 in dependancy on the distance of displacement of the vertebral column 46 by the transporting disks 43, i.e. depending on the thickness of the vertebrae and thus on the size of the fish.

Simultaneously with the controlling of the guiding elements 35 for producing the gap 40, the pressing lamella 44 are controlled into contact with the flanks of the fish rump 45, so that the ribs 49 arrive safely underneath the third circular knives 7 of the third cutting tool 4. A time-delayed controlling of the movement of the pressing lamella 44 occurring in a continuing manner from the outside inwardly can help to achieve an improvement of the cutting quality and the yield.

For safeguarding the continuity of the conveying a further pair of spike wheels 20 can be arranged between those shown in FIG. 1 and the pair of transporting disks 43.

In order to improve the yield in fillet meat even further, a size detection value, preferably a length detection value which has been determined on each fish before the start of the filleting may be evaluated such that taking this value into account a pre-setting of the distance of the first and second circular knives 5 and 6 of the first and second cutting tools 2 and 3, respectively, may be performed. This detection or measurement value may also be used in a similar sense for influencing the time of activating the third cutting tool 4.

What is claimed is:

1. An apparatus for severing muscle meat from the skeleton of decapitated fish, conveyed against their normal swimming direction through said apparatus along a path of movement and having a vertebral column as well as belly spokes, back spokes and at least one of ribs and vertebral appendages extending from said vertebral column, said apparatus comprising
 a) cutting tools provided with cutting edges for carrying out said muscle meat severing including
  aa) at least first and second pairs of essentially parallel circular knives, each, for cutting free said belly spokes and said back spokes, respectively;
  ab) at least one pair of third circular knives with cutting edges for cutting free said at least one of said ribs and said lateral vertebral appendages and arranged in a roof-like manner relative to each other to define a summit portion in the area of closest approximation of said cutting edges; and
 b) guide means, which intrude into the incisions produced by said first and second pairs of knives, respectively, and wherein said guide means which include
  ba) first guides penetrating into the incisions produced by said first pair of knives to cut free said belly spokes, and
  bb) second guides penetrating into the incisions produced by said second pair of knives at both sides of said back spokes;
 said cutting tools and said guide means being arranged along said path of movement such as to leave a gap for the passage of said vertebral column with said first pair of knives and said first guides positioned on a first side of said gap and with said second pair of knives and said second guides positioned on a second side of said gap; wherein
 c) said apparatus further comprises displacer means for controlling the position of said vertebral column with regard to said gap, which displacer means are arranged to follow said second guides on said second side of said gap a short distance upstream of said summit of said third knives, and to lie essentially flush with said second guides and, with their points closest to said passage, essentially at the level of said summit portions of said third knives lying adjacent to said gap; and
 d) said guide means further include third guides arranged in the region of said third circular knives to oppose said displacer means and comprising guiding elements, which have guiding faces arranged parallel to respective inner faces of said third circular knives, said guiding faces being arranged to be displaced, in a first movement, parallel to the respective neighboring one of said third circular knives against spring force and to be controlled, in a second movement, to approach each other in a direction perpendicular to said inner faces of third circular knives.

2. An apparatus as claimed in claim 1, wherein said guiding elements are arranged to be displaced under control into an operative position corresponding to the size of a second gap portion between said guiding face of said guiding elements and said inner face of the respective one of said third circular knives, said controlling being performed depending on the thickness of said vertebral column of the respective fish being treated.

3. An apparatus as claimed in claim 1, wherein said displacer means include a pair of cone-disk-shaped transport disks having a periphery adapted for easy gripping, the arrangement of said disks being such that part of their periphery facing the path of the fish being treated lies essentially tangential with guiding edges formed on said guiding elements.

4. An apparatus as claimed in claim 1, wherein said apparatus includes one set each of pressing lamella provided in the region immediately upstream of each of said third circular knives, said lamella being arranged for controlled movement from an outward position into said path of movement of said fish and against the flanks thereof in cooperation with said controlled movement of said guiding elements into their operative position.

5. An apparatus as claimed in claim 4, wherein the single pressing lamella of said each set are arranged to be moved inwardly in a direction towards said path of movement under control in a time-graduated manner.

6. An apparatus as claimed in claim 1, comprising a sensor for controlling said path of movement with regard to said belly spokes, which sensor is arranged upstream of said third circular knives and issues a signal which is utilized for controlling said guiding elements to move into their operative position.

7. An apparatus as claimed in claim 6, wherein said sensor is designed as a photoelectrically active transmitted-light sensor.

8. An apparatus as claimed in claim 7, wherein said first guides are composed of a pair of web-shaped elements leaving between them a first gap portion of said gap for the passage of said belly spokes, and wherein said sensor is arranged in said first guides and comprises a light emitter and a light receiver, which are arranged in opposing positions on said both sides of said gap in said web-shaped elements.

9. An apparatus as claimed in claim 8, wherein said web-shaped elements are made from a wear resistant plastic material, and wherein said light emitter and said light receiver are covered with respect to faces of said web-shaped elements bounding said first gap portion.

10. An apparatus as claimed in claim 1, wherein said guiding elements of said third guides are arranged such that, in a basic position thereof, they cover completely at least the operative portions of said cutting edges of said third circular knives, and wherein said guiding elements are provided with guiding edges essentially lying tangential to said summit portions of said cutting edges.

11. An apparatus as claimed in claim 10, wherein said guiding elements are arranged to be displaced under control into an operative position corresponding to the size of a second gap portion between said guiding face of said guiding elements and said inner face of the respective one of said third circular knives, said controlling being performed depending on the thickness of said vertebral column of the respective fish being treated.

12. An apparatus as claimed in claim 10, comprising a sensor for controlling said path of movement with regard to said belly spokes, which sensor is arranged upstream of said third circular knives and issues a signal which is utilised for controlling said guiding elements to move into their operative position.

13. An apparatus as claimed in claim 12, wherein said sensor is designed as a photoelectrically active transmitted-light sensor.

14. An apparatus as claimed in claim 13, wherein said first guides are composed of a pair of web-shaped elements leaving between them a first gap portion of said gap for the passage of said belly spokes, and wherein said sensor is arranged in said first guides and comprises a light emitter and a light receiver, which are arranged in opposing positions on said both sides of said gap in said web-shaped elements.

15. An apparatus as claimed in claim 14, wherein said web-shaped elements are made from a wear resistant plastic material, and wherein said light emitter and said light receiver are covered with respect to faces of said web-shaped elements bounding said first gap portion.

* * * * *